Patented July 10, 1923.

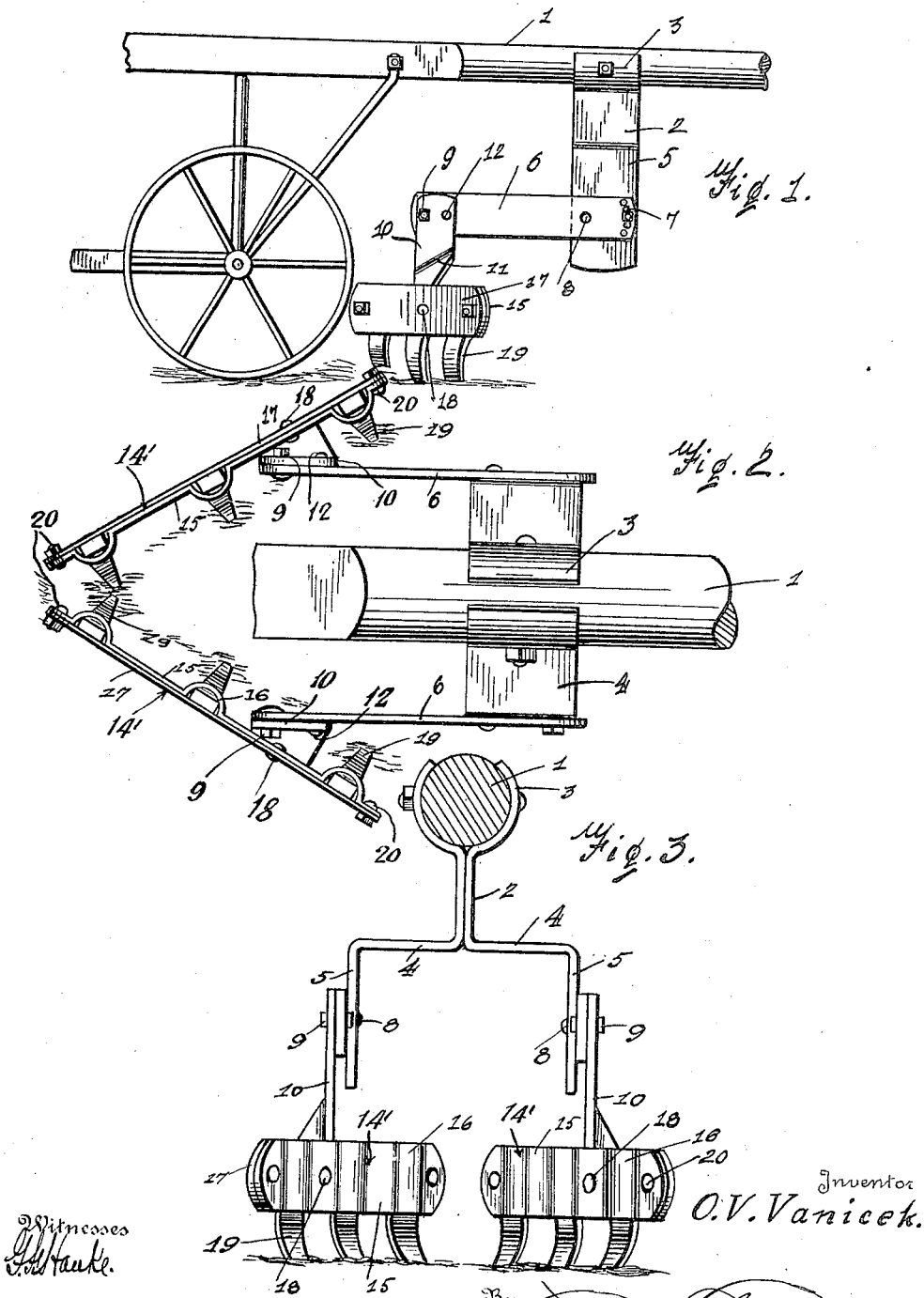

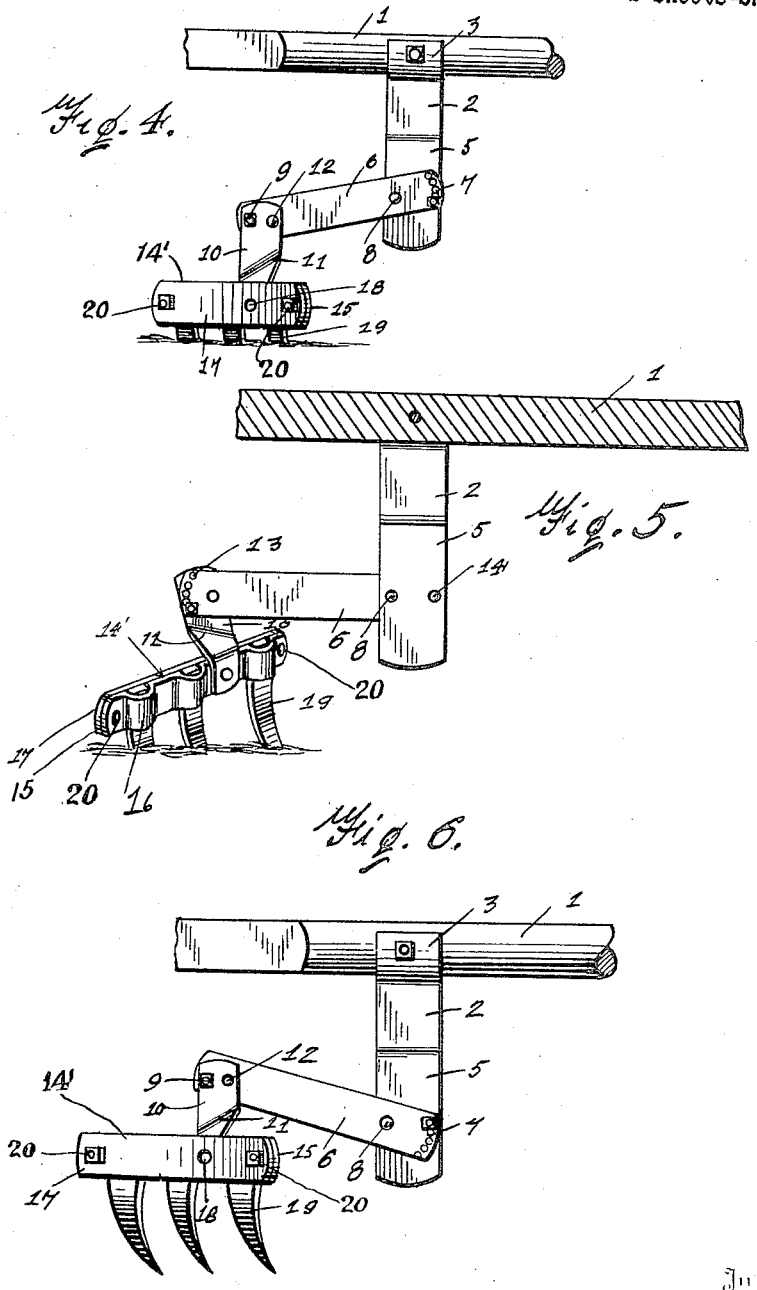

1,461,053

UNITED STATES PATENT OFFICE.

OTTO V. VANICEK, OF TEMPLE, TEXAS.

CULTIVATOR HARROW.

Application filed October 10, 1921. Serial No. 506,691.

*To all whom it may concern:*

Be it known that I, OTTO V. VANICEK, a citizen of the United States, residing at Temple, in the county of Bell, State of Texas, have invented certain new and useful Improvements in Cultivator Harrows; and I do hereby declare the following to be a full, clear, and exact description of the invention, such as will enable others skilled in the art to which it appertains to make and use the same.

This invention relates to a cultivator harrow.

An object of the invention is to construct a harrow of such form that the same may be readily attached to the draft beam of a cultivator in front of the cultivator teeth.

A further object of the invention is to so construct the harrow that the teeth thereof may be adjusted to any one of a number of angles and held in their adjusted positions.

A still further object of the invention is to so construct the device that the cultivator teeth may be entirely lifted from the ground and secured in such position.

A still further object of the invention is to adjustably mount the teeth in such manner that the distance with which the harrow teeth penetrates the ground may be varied.

With these and other objects in view, such as will appear as the description progresses, my invention comprises the combination and arrangement of parts as herein set forth and subsequently claimed.

Referring to the drawing:—

Fig. 1 is a side elevation of the device attached to a cultivator.

Fig. 2 is a plan view of the device.

Fig. 3 is a front elevation thereof.

Fig. 4 is a side elevation of the device in its adjusted position.

Fig. 5 is a longitudinal section showing one of the teeth carrying members adjusted so as to cause the teeth to penetrate the ground to different distances.

Fig. 6 is a side elevation showing the teeth of the harrow entirely raised from the ground.

Referring to the drawing wherein like parts are indicated by like characters throughout the several views:—

My device is constructed to be attached to the draft beam 1 of a cultivator.

On the side of the draft beam 1 of the cultivator is secured a downwardly extending bracket 2 having a clamping portion 3 on its upper end and a horizontal portion 4 and a vertical downwardly extending portion 5. The clamping portion 3 is provided with a hole through which a bolt passes to secure the same to the draft beam 1.

Pivotally secured to the vertical portion 5 of the bracket 2 is a rearwardly extending arm 6 having a series of apertures 7 adjacent the ends thereof and concentric with the pivotal point 8. Pivotally secured at 12 to the other end of each of the members 6 is a downwardly extending arm 10 bent as at 11 near the lower end thereof at an angle to the plane of the arm 6. In the upper end of each of the arms 10 is formed a hole 9 which is arranged to register with any one of a number of holes 13 formed concentric with the pivot 12 so that the arm 10 may be adjusted with relation to the arm 6 and held in any of its adjusted positions by passing a bolt through the hole 9 and through any one of the holes 13.

In the vertical portion 5 of the member 2 is formed a hole 14 which is arranged to register with any of the holes 7 in the member 6 and through which a bolt is adapted to pass to hold the member 6 in angular relation to the vertical portion 5 of the member 2.

Secured to the lower end of each of the members 10 is a tooth carrying member 14' which comprises a plate 15 having a series of semi-cylindrical transversely extending sockets 16 therein and a flat plate 17 pivotally secured by means of a rivet 18 to the plate 15 so that the said plate 17 may be swung either to open or close the semi-cylindrical sockets 16. These plates 15 and 17 are held together and clamp the teeth 19 in the sockets 16 by bolts 20.

When the parts of the device are in the relative position shown in Fig. 1 and it is desired to throw the teeth 19 further into the ground and yet allow the same to operate in a horizontal plane it is only necessary to remove the bolts from the holes 7 and 13 and to swing the member 6 about its pivot 8 so that one of the holes 7 in the end of the said member below the hole which has been previously used comes in alignment with the hole 14. At this time it is only necessary to reinsert the bolt in the said hole to maintain the arm 6 in angular relation to the vertical portion of the bracket 2.

It is of course to be understood that both of the arms 6 may be adjusted together or if it is desirable they may be adjusted independently.

After this adjustment has been made it is then necessary to remove the bolt and swing the arm 10 into a vertical position so that the tooth carrying member 14' will be in a horizontal position. The bolt is then inserted through the hole 9 in the arm 10 and through the registering hole 13 in the arm 6.

The harrow may then be operated with the teeth 19 digging quite deeply in the ground.

If it be desirable to adjust the teeth so that the innermost teeth on the members 14' will dig deeply in the ground and the outermost teeth will be lifted clear of the ground or will only dig slightly into the same, the arms 6 should be left in their horizontal positions and the arms 10 adjusted about their pivots so as to be swung forwardly.

From the foregoing description it may be readily seen that I have constructed a harrow which may be readily attached to a cultivator and which may be adjusted to lift the teeth thereof clear of the ground, or to cause the same to uniformly dig into the ground to various depths.

I have still further means for adjusting the tooth carrying members of the device in such manner that innermost teeth on the said members may be adjusted to dig deeply into the ground, while the outermost teeth are lifted entirely clear of the ground or dig only slightly into the same.

While I have described a particular embodiment of my invention shown, I wish it to be understood that I do not wish to be limited to that particular embodiment for it is obvious that numerous changes may be made within the scope of the invention as defined by the claims.

What is claimed is:—

1. In combination with a cultivator, a plurality of downwardly extending diverging supporting members arranged to be secured to the beam of the cultivator, horizontally disposed arms pivotally secured to the lower end of the said supporting members and extending rearwardly therefrom, downwardly extending arms pivotally secured to the outer ends of the first mentioned arms, the said last mentioned arms being bent at an angle to the first mentioned arms, tooth carrying members secured to the lower ends of said last mentioned arms and extending inwardly and rearwardly toward each other.

2. In combination, with a cultivator, a harrow arranged to be secured to the draft beam thereof in advance of the cultivator teeth, downwardly extending supporting brackets, arms pivotally secured to the lower ends of said brackets and having a plurality of holes in the ends thereof, bolts insertible through any one of the said holes and through the brackets, arms pivoted to the other ends of the said first mentioned arms, the lower ends of which arms are bent at angles to the planes of the first mentioned arms, means for maintaining the last mentioned arms in any one of a plurality of positions with relation to the first mentioned arms, and rearwardly and inwardly extending tooth carrying members secured to the lower ends of the said last mentioned arms.

In testimony whereof, I affix my signature, in the presence of two witnesses.

OTTO V. VANICEK.

Witnesses:
JNO. B. DANIEL,
JUANITA WYLIE.